(12) United States Patent
Futae et al.

(10) Patent No.: US 11,088,592 B2
(45) Date of Patent: Aug. 10, 2021

(54) ELECTRIC COMPRESSOR

(71) Applicant: MITSUBISHI HEAVY INDUSTRIES, LTD., Tokyo (JP)

(72) Inventors: Takaya Futae, Tokyo (JP); Shunsuke Yakushiji, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 268 days.

(21) Appl. No.: 16/182,718

(22) Filed: Nov. 7, 2018

(65) Prior Publication Data

US 2019/0157942 A1  May 23, 2019

(30) Foreign Application Priority Data

Nov. 21, 2017 (JP) .............................. JP2017-223824

(51) Int. Cl.
| | |
|---|---|
| H02K 5/24 | (2006.01) |
| H02K 1/18 | (2006.01) |
| F02B 37/04 | (2006.01) |
| F04D 25/06 | (2006.01) |
| F04D 25/08 | (2006.01) |
| H02K 7/14 | (2006.01) |
| H02K 9/22 | (2006.01) |
| H02K 21/14 | (2006.01) |

(52) U.S. Cl.
CPC ............... *H02K 5/24* (2013.01); *F02B 37/04* (2013.01); *F04D 25/0606* (2013.01); *F04D 25/08* (2013.01); *H02K 1/185* (2013.01); *H02K 7/14* (2013.01); *H02K 9/22* (2013.01); *H02K 21/14* (2013.01)

(58) Field of Classification Search
CPC ...................................................... H02K 5/24
See application file for complete search history.

(56) References Cited

U.S. PATENT DOCUMENTS

| 4,652,782 A | 3/1987 | Rossie |
|---|---|---|
| 2003/0020338 A1 | 1/2003 | Hirsou et al. |
| 2011/0239694 A1 | 10/2011 | Sugitani et al. |
| 2012/0242186 A1 | 9/2012 | Hattori |
| 2013/0257207 A1 | 10/2013 | Nemoto et al. |
| 2014/0197705 A1 | 7/2014 | Sato et al. |

(Continued)

FOREIGN PATENT DOCUMENTS

| CN | 1967969 A | 5/2007 |
|---|---|---|
| CN | 102213221 A | 10/2011 |

(Continued)

*Primary Examiner* — Ramon M Barrera
(74) *Attorney, Agent, or Firm* — Osha Bergman Watanabe & Burton LLP (57) ABSTRACT

An electric compressor includes a compressor unit configured to compress air and a motor unit configured to drive the compressor unit. The motor unit includes a housing that forms an outer frame of the motor unit, a rotor that is provided in the housing and rotatably supported around a central axis O, a stator that is disposed radially outward from the rotor, and a stator holder which is fixed to the housing only in a part in a central axis O direction and is provided such that there is a gap in a radial direction crossing the central axis O between it and an inner circumferential surface of the housing in the rest in the central axis O direction and inside which the stator is accommodated.

9 Claims, 7 Drawing Sheets

(56) References Cited

U.S. PATENT DOCUMENTS

2014/0300245 A1   10/2014  Ohashi et al.
2015/0076940 A1    3/2015  Ohashi et al.
2019/0027989 A1*  1/2019  Ishigami .............. H02K 15/065

FOREIGN PATENT DOCUMENTS

| | | |
|---|---|---|
| CN | 104335453 A | 2/2015 |
| DE | 102011088477 A1 | 6/2013 |
| GB | 2293695 A | 4/1996 |
| JP | 57065253 A * | 4/1982 ............. H02K 1/185 |
| JP | S62-233041 A | 10/1987 |
| JP | H08-182277 A | 7/1996 |
| JP | 2002-186204 A | 6/2002 |
| JP | 4092195 B2 | 5/2008 |
| JP | 2009-060760 A | 3/2009 |
| JP | 2009-142031 A | 6/2009 |
| JP | 2012130157 A | 7/2012 |
| JP | 2014-138487 A | 7/2014 |
| JP | 2014-204624 A | 10/2014 |
| JP | 2015-089173 A | 5/2015 |
| MY | 141124 A * | 3/2010 |
| WO | 2011-080817 A1 | 7/2011 |
| WO | 2013-087255 A2 | 6/2013 |
| WO | 2013-164889 A1 | 11/2013 |
| WO | 2017-042235 A1 | 3/2017 |

\* cited by examiner

ELECTRIC COMPRESSOR

BACKGROUND OF THE INVENTION

Field of the Invention

The present invention relates to an electric compressor.
Priority is claimed on Japanese Patent Application No. 2017-223824, filed Nov. 21, 2017, the content of which is incorporated herein by reference.

Description of Related Art

In a turbocharger for a vehicle such as an automobile, when a driver in a vehicle operates an accelerator, the response of the turbocharger is delayed and a so-called turbo lag may occur. Turbo lag is caused when a rotational speed of an engine increases in response to an operation of the accelerator, and air cannot be sufficiently compressed until the pressure of exhaust gas discharged from the engine increases.

In order to eliminate turbo lag in a turbocharger, there is a method of combining electric compressors. An electric compressor includes an electric motor and a compressor unit that is driven by the electric motor. Such an electric compressor operates the electric motor in response to an accelerator operation performed by a driver in a vehicle, and drives the compressor unit. The compressor unit compresses air. This compressed air is sent to a compressor wheel or an engine of the turbocharger.

In an electric motor, during operation, a housing may vibrate due to rotation of a rotor, and noise may occur. Specifically, vibration occurs in a stator due to an electromagnetic force that is generated according to an interaction between a magnetic field of a permanent magnet provided in the rotor that rotates and a current that flows in a coil that is provided in the stator. The vibration of the stator is transmitted to the housing. Thereby, the housing vibrates, and noise may occur.

For example, in Patent Document 1, a technology in which a thermally conductive resin that can expand and contract in the radial direction is disposed between a housing and a stator of an electric motor is disclosed. In such a configuration, it is possible to release mechanical coupling between the housing and the stator in the radial direction and reduce transmission of vibration resulting from rotation of the rotor to the housing through the stator.

PATENT DOCUMENTS

[Patent Document 1] Japanese Patent No. 4092195

SUMMARY OF THE INVENTION

In Patent Document 1, the housing and the stator are in contact with each other through the resin. Therefore, vibration resulting from rotation of the rotor is transmitted to the housing from the stator through the resin.

In an electric compressor for supercharging, a rotational speed of the electric motor during operation may be 10,000 rpm or more. In this case, noise resulting from vibration of the housing may be large at a frequency that is two or four times a rotational frequency of the electric motor. Therefore, when a configuration disclosed in Patent Document 1 is applied to an electric motor of an electric compressor for a turbocharger, there is a possibility of noise not being sufficiently reduced.

In addition, in Patent Document 1, since the stator is in contact with the housing through the resin, heat of the stator is unlikely to be transmitted to the housing, and there is a possibility of the stator not dissipating heat sufficiently.

An object of the present invention is to provide an electric compressor capable of reducing vibration of a housing of an electric motor and suppressing generation of noise while sufficiently dissipating heat.

Means for Solving the Problems

According to a first aspect of the present invention, an electric compressor includes a compressor unit configured to compress air; and a motor unit configured to drive the compressor unit, wherein the motor unit includes a housing that forms an outer frame of the motor unit, a rotor that is provided in the housing and rotatably supported around a central axis, a stator that is disposed radially outward from the rotor, and a stator holder which is fixed to the housing only in a part in a central axis direction and is provided such that there is a gap in the radial direction around the central axis between it and an inner circumferential surface of the housing in the rest in the central axis direction, and inside which the stator is accommodated.

In such a configuration, except for a part fixed to the housing in the central axis direction, there is a gap in the radial direction between the stator holder in which the stator is accommodated and an inner circumferential surface of the housing. Therefore, vibration resulting from rotation of the rotor is unlikely to be transmitted to the housing through the stator holder. Thereby, it is possible to reduce vibration of the housing and generation of noise. In addition, since the stator holder is fixed to the housing at a part in the central axis direction, heat can be directly conducted to the housing from the stator through the stator holder. Therefore, the stator can dissipate heat sufficiently.

According to a second aspect of the present invention, the stator holder according to the first aspect may be fixed to the housing at least at a first end in the central axis direction.

In such a configuration, in a part other than at least the first end in the central axis direction of the stator holder, there is a gap in the radial direction between the stator holder and the inner circumferential surface of the housing. Therefore, vibration resulting from rotation of the rotor is unlikely to be transmitted to the housing through the stator holder. On the other hand, since the stator holder is fixed to the housing at least at the first end, heat can be conducted from the stator holder to the housing through the fixed part.

According to a third aspect of the present invention, the stator holder according to the first or second aspect may be fixed to the housing only at the first end in the central axis direction. In this manner, when the stator holder is fixed to the housing only at the first end in the central axis direction, it is possible to minimize a part of the stator holder fixed to the housing. Accordingly, it is possible to further reduce transmission of vibration resulting from rotation of the rotor to the housing through the stator holder. In addition, since the stator holder is fixed to the housing at the first end, heat can be conducted from the stator holder to the housing through the fixed part.

In a fourth aspect of the present invention, the stator holder according to the third aspect may have a spacer between the stator holder and the housing in the radial direction at a second end in the central axis direction.

In such a configuration, when the stator holder is fixed only at the first end in the central axis direction, it is possible to reduce displacement of the side of the second end of the stator holder in the central axis direction in the radial direction.

According to a fifth aspect of the present invention, the stator holder according to any one of the first to fourth aspects may include a fixing part that is fixed to the housing in a part in the central axis direction, a holder body part that holds the stator, and a low-rigidity part which is provided between the fixing part and the holder body part in the central axis direction and has lower rigidity than the fixing part and the holder body part.

In such a configuration, when the stator vibrates during rotation of the rotor, vibration of the stator is transmitted from the holder body part to the fixing part through the low-rigidity part. Since the low-rigidity part provided between the fixing part and the holder body part has lower rigidity than the fixing part and the holder body part, when the holder body part vibrates due to vibration transmitted from the stator, the low-rigidity part elastically deforms. Due to elastic deformation of the low-rigidity part, vibration of the stator is attenuated, and vibration transmitted to the fixing part can be reduced. Thereby, it is possible to further effectively reduce transmission of vibration resulting from rotation of the rotor to the housing through the stator holder.

In a sixth aspect of the present invention, the low-rigidity part according to any one of the first to fifth aspects may have an opening part-forming part in which a plurality of opening parts are formed at intervals in a circumferential direction around the central axis.

In such a configuration, the rigidity of the stator holder can be reduced by an amount corresponding to the opening part formed by the opening part-forming part. Therefore, it is possible to easily reduce the rigidity in the low-rigidity part.

In a seventh aspect of the present invention, the stator holder according to any one of the first to sixth aspects may have a polygonal cross-sectional shape in a direction crossing the central axis at least in the holder body part.

In such a configuration, it is possible to increase the rigidity of the stator holder, and the stator holder is unlikely to be influenced by vibration resulting from rotation of the rotor.

According to an eighth aspect of the present invention, the number of corners of the polygonal shape may be an odd number when an order of harmonics in which vibration of the stator increases according to rotation of the rotor is an even number, and may be an even number when the order of harmonics is an odd number.

In such a configuration, it is possible to prevent a direction in which the stator deforms and vibrates according to rotation of the rotor from matching a direction in which the stator holder easily deforms. Therefore, the stator holder is unlikely to be influenced by vibration of the stator.

According to a ninth aspect of the present invention, in the electric compressor according to any one of the first to eighth aspects, a filler may be filled between the stator holder and the stator in the radial direction.

In such a configuration, according to the filler, thermal conductivity between the stator holder and the stator increases, and heat generated in the stator when the rotor operates can be transmitted to the stator holder 30 efficiently and it is possible to improve heat dissipation.

According to the electric compressor, the stator can dissipate heat sufficiently, and it is possible to reduce vibration of the housing of the electric motor and generation of noise.

DETAILED DESCRIPTION OF THE INVENTION

First Embodiment

Figure 1:
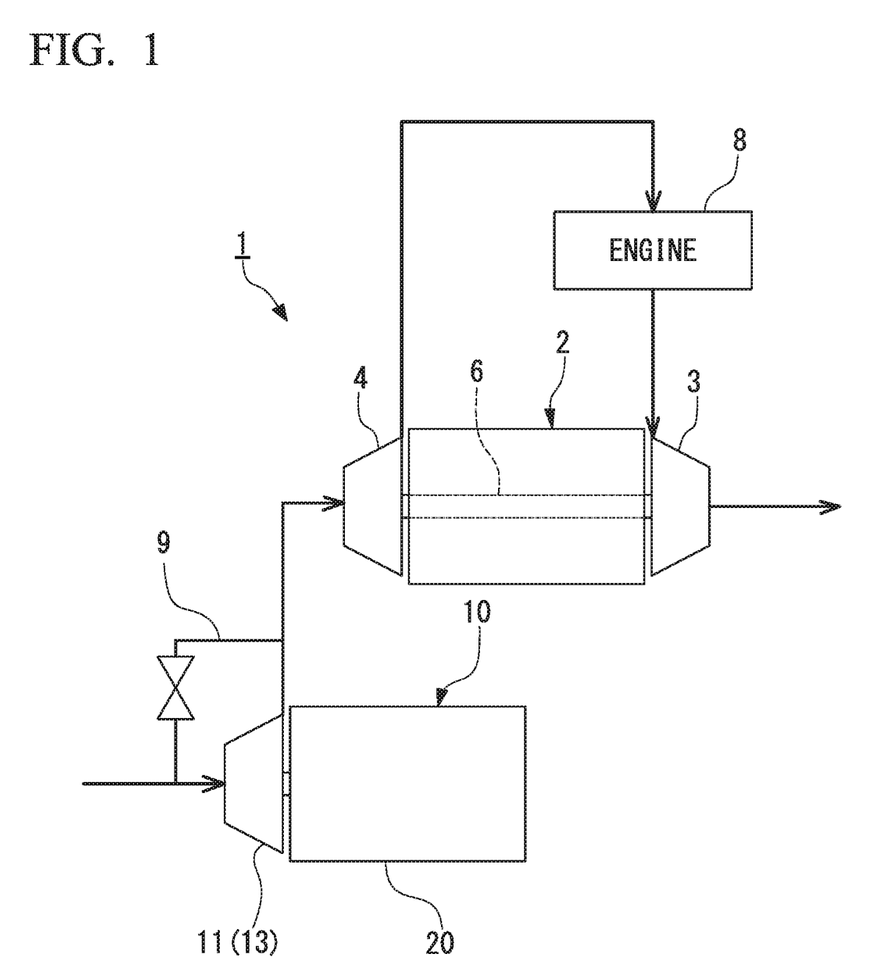
FIG. 1 is a schematic diagram showing a schematic configuration of a turbocharger system including an electric compressor in an embodiment of the present invention.

FIG. 1 is a schematic diagram showing a schematic configuration of a turbocharger system including an electric compressor of this embodiment.

As shown in FIG. 1, a turbocharger system 1 in the first embodiment includes a turbocharger 2, an engine 8, and an electric compressor 10.

The turbocharger 2 includes a turbine wheel 3 and a compressor wheel 4. The turbine wheel 3 converts thermal energy of exhaust gas discharged from the engine 8 into rotational energy. The compressor wheel 4 is linked to the turbine wheel 3 through a rotation shaft 6, and rotational energy converted in the turbine wheel 3 is transmitted through the rotation shaft 6. The compressor wheel 4 compresses air introduced from the outside using rotational energy transmitted from the turbine wheel 3, and sends it to the engine 8.

The electric compressor 10 includes a compressor unit 11 including an impeller 13 and a motor unit 20 that drives the compressor unit 11. The electric compressor 10 rotates the impeller 13 of the compressor unit 11 using rotational energy generated by the motor unit 20, and compresses air. Air compressed by the compressor unit 11 is sent to the compressor wheel 4 of the turbocharger 2.

The electric compressor 10 in this embodiment is controlled so that, for example, it operates only when a rotational speed of the engine 8 is lower than a predetermined threshold value. When the electric compressor 10 is not operated, air taken from the outside passes through a bypass path 9, and is sent to the compressor wheel 4 of the turbocharger 2 without passing through the electric compressor 10.

Figure 2:
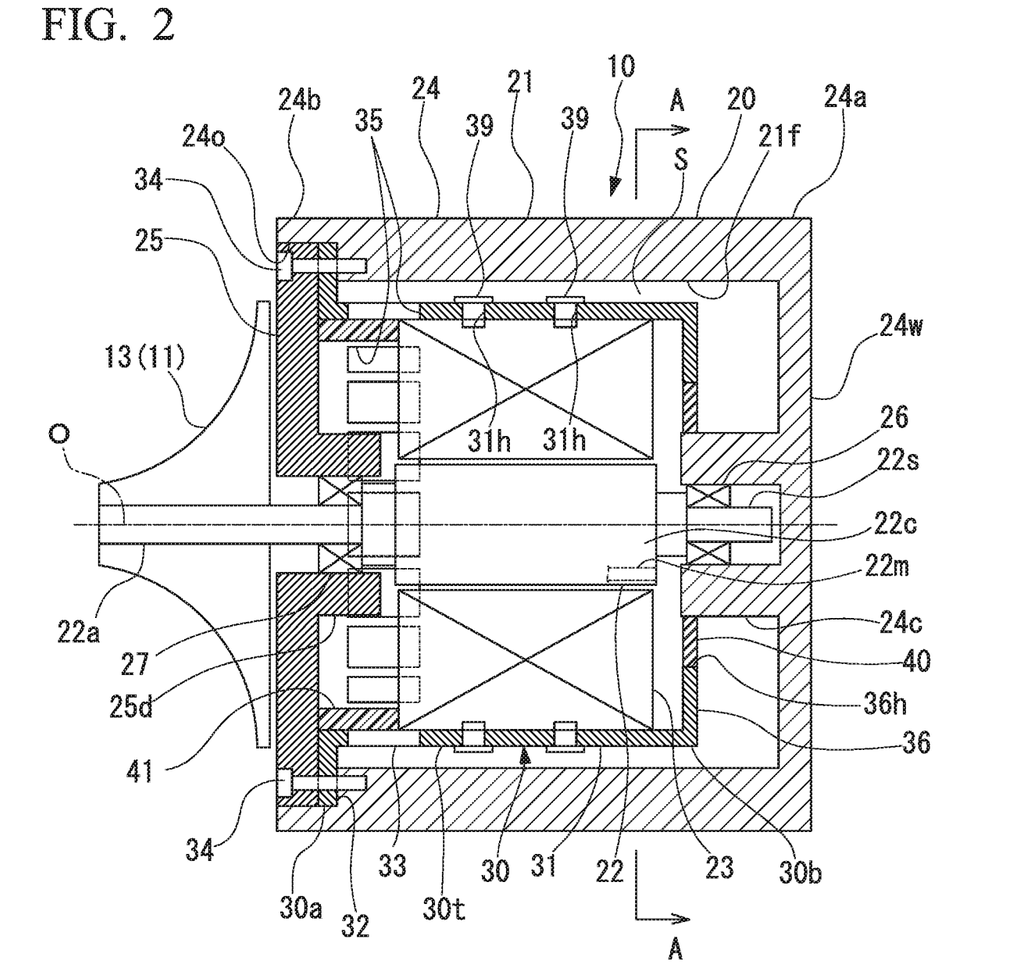
FIG. 2 is a cross-sectional view of an electric compressor in a first embodiment of the present invention.

FIG. 2 is a cross-sectional view of an electric compressor in the first embodiment of the present invention.

As shown in FIG. 2, the motor unit 20 includes a housing 21, a rotor 22, a stator 23, and a stator holder 30.

The housing 21 forms an outer frame of the motor unit 20. The housing 21 includes a housing body 24 and a lid 25.

The housing body 24 is formed in a cylindrical shape (in other words, a bottomed cylindrical shape) in which the side of a first end 24a in a central axis O direction is blocked by an end wall 24w. The end wall 24w exemplified in the embodiment extends in a direction crossing the central axis O at a position of the first end 24a in the central axis O direction. The housing body 24 has an opening 24o that opens in the central axis O direction at a second end 24b in the central axis O direction.

The lid 25 extends in a direction crossing the central axis O and is disposed to block the opening 24o of the housing body 24.

The rotor 22 is disposed in the housing 21. The rotor includes a rotor shaft 22s and a permanent magnet 22m. The rotor shaft 22s extends in the central axis O direction. The rotor shaft 22s is rotatably supported around the central axis O by bearings 26 and 27. The bearings 26 and 27 are provided at intervals in the central axis O direction. The bearing 26 is held by a bearing support 24c provided on the end wall 24w of the housing body 24. The bearing 27 is held by a bearing support 25d provided on the lid 25. An end 22a on the side of the lid 25 of the rotor shaft 22s passes through the lid 25 and protrudes outside of the housing 21. Outside of the housing 21, the impeller 13 is provided at the end 22a of the rotor shaft 22s.

The permanent magnet 22m is held by a core part 22c formed in an intermediate part of the rotor shaft 22s in the central axis O direction. A plurality of permanent magnets 22m are provided at intervals in the circumferential direction around the central axis O. Here, disposition of the permanent magnets 22m is not limited to the disposition in FIG. 2, and various dispositions can be used.

The stator 23 is disposed outside the rotor 22 in the radial direction. The stator 23 is disposed such that there is a gap in the radial direction between it and the rotor 22. In the stator 23, a coil (not shown) is wound around a plurality of teeth (not shown) provided at intervals in the circumferential direction around the central axis O.

Figure 3:
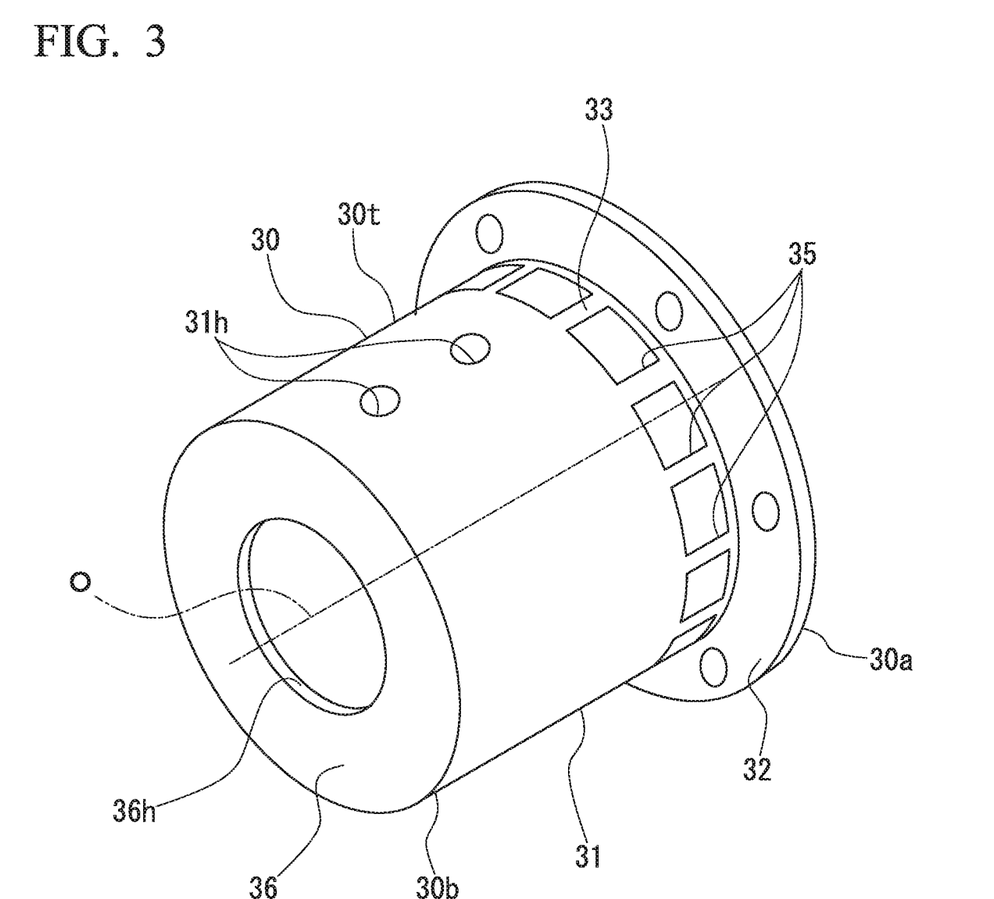
FIG. 3 is a perspective view showing a stator holder in the first embodiment of the present invention.

FIG. 3 is a perspective view showing a stator holder in the first embodiment of the present invention.

As shown in FIG. 2 and FIG. 3, the stator holder 30 accommodates the stator 23 therein. The stator holder 30 is formed of a metal material having high thermal conductivity or the like. The stator holder 30 includes a tubular part 30t, a fixing part 32, and an end wall 36.

The tubular part 30t is formed in a cylindrical shape that extends in the central axis O direction, and includes a holder body part 31 and a low-rigidity part 33.

The holder body part 31 has a circular cross-sectional shape that is orthogonal to the central axis O and accommodates the stator 23 on the inside in the radial direction. The holder body part 31 and the stator 23 are fastened by a fastener 39 having a male screw part that extends in the radial direction or the like. In the holder body part 31, a screw insertion hole 31h is formed in order to insert the fastener 39 therethrough. For example, two fasteners 39 are disposed in an intermediate part of the tubular part 30t in the central axis O direction at intervals in the central axis O direction.

In addition, the outer diameter of the holder body part 31 is formed to be smaller than an inner diameter of the housing body 24 by a predetermined size.

The fixing part 32 is formed at a first end 30a in the central axis O direction in the stator holder 30. The fixing part 32 is formed in a flange shape that extends outward in the radial direction from the tubular part 30t around the central axis O. The fixing part 32 is fixed to the housing body 24 by a bolt 34 that extends in the central axis O direction together with the lid 25. The fixing part 32 that is fixed to the housing body 24 is interposed between the housing body 24 and the lid 25.

The end wall 36 extends from a second end 30b of the stator holder 30 in the central axis O direction toward the inside in the radial direction around the central axis O. The end wall 36 is integrally formed with the tubular part 30t. Here, when the stator 23 is inserted into the tubular part 30t during the motor unit 20 being assembled, for example, the stator 23 is struck to the end wall 36, and thus positioning in the central axis O direction of the stator 23 can be performed.

The end wall 36 has a through-hole 36h through which the rotor shaft 22s or the like penetrates in the central axis O direction at the center part in the radial direction around the central axis O.

The low-rigidity part 33 is provided between the fixing part 32 and the holder body part 31 in the central axis O direction. In the low-rigidity part 33, an opening part 35 is formed. The opening part 35 is formed to penetrate through the tubular part 30t in the plate thickness direction (radial direction). A plurality of opening parts 35 are formed at intervals in the circumferential direction around the central axis O. In this manner, when the opening part 35 is formed, the low-rigidity part 33 has lower rigidity (a secondary moment in a cross section) than the fixing part 32 and the holder body part 31. Here, within the tubular part 30t, an opening part-forming part of the present invention is formed by a peripheral part of the opening part 35.

The low-rigidity part 33 is formed at a position different from the screw insertion hole 31h for fixing the stator holder 30 in the above stator 23 in the central axis O direction. Thereby, it is possible to reduce inhibition of elastic deformation of the low-rigidity part 33 by the stator 23 fixed to the fastener 39.

The stator holder 30 is fixed to the housing 21 only at the fixing part 32 provided on the side of the first end 30a in the central axis O direction. In other words, the stator holder 30 is fixed to the housing 21 only by a part thereof in the central axis O direction. In addition, in other words, the stator holder 30 is supported like a so-called cantilever beam with respect to the housing 21.

Figure 4:
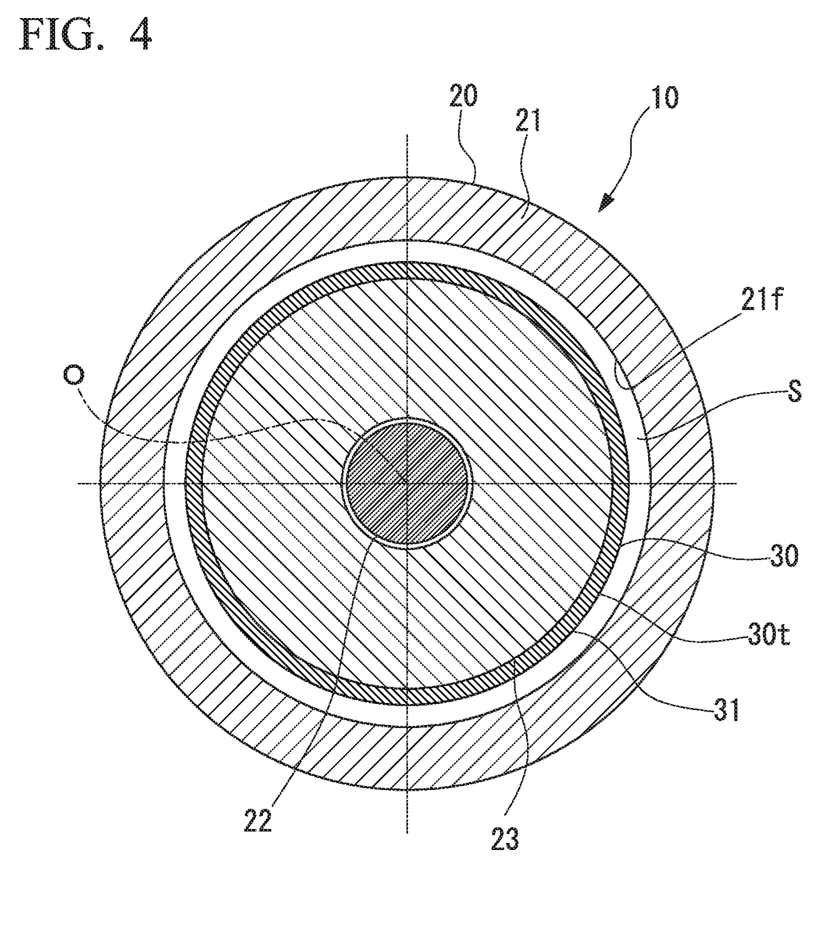
FIG. 4 is a cross-sectional view taken along the line A-A in FIG. 2.

FIG. 4 is a cross-sectional view taken along the line A-A in FIG. 2.

As shown in FIG. 2 and FIG. 4, the tubular part 30t constituting the rest other than the fixing part 32 of the stator holder 30 in the central axis O direction is provided such that there is a gap S in the radial direction around the central axis O between it and an inner circumferential surface 21f of the housing 21.

In such a configuration, except for a part in the central axis O direction in which the stator holder 30 is fixed to the housing 21 (the fixing part 32), a gap S is provided in the radial direction between the stator holder 30 and the inner circumferential surface 21f of the housing 21. Therefore, even if the stator 23 vibrates according to rotation of the rotor 22, vibration in the radial direction is unlikely to be transmitted to the housing 21 through the stator holder 30.

The stator holder 30 has a spacer 40 between the through-hole 36h of the end wall 36 and the bearing support 24c of the housing 21 at the second end 30b. The spacer 40 prevents the stator holder 30 from vibrating in the radial direction and coming in contact with the housing 21. More specifically, the spacer 40 prevents the stator holder 30 from approaching the housing 21 to a predetermined degree or more while allowing vibration. The spacer 40 can be formed of a more flexible material than the stator holder 30, for example, a resin material or a rubber material. In addition, as the spacer 40, for example, a tube type damper that does not stretch by a predetermined degree or more (for example, an oil damper) may be used.

Here, the above spacer 40 may be formed in an annular shape that is continuous in the circumferential direction, and a plurality of spacers may be provided at intervals in the circumferential direction. In addition, the spacer 40 may be provided only above the bearing support 24c as long as it reduces downward deformation of the second end 30b of the stator holder 30.

In addition, the spacer 40 may be provided between the outer circumferential surface of the stator holder 30 and the inner circumferential surface of the housing 21. In this case, the spacer 40 may be provided only below the stator holder 30 as long as it reduces downward deformation of the second end 30b of the stator holder 30. Here, the spacer 40 may be provided as necessary. For example, if there is no possibility of the second end 30b of the stator holder 30 coming in contact with the housing 21, the spacer 40 may be omitted.

Incidentally, a ring member 41 having an annular shape made of, for example, a rubber material, is provided between the stator 23 and the lid 25. The ring member 41 reduces movement of the stator 23 in the stator holder 30 in the central axis O direction.

Therefore, according to the electric compressor 10 of the first embodiment described above, except for a part of the fixing part 32 in the central axis O direction in which the stator holder 30 in which the stator 23 is accommodated is fixed to the housing 21, a gap S in the radial direction is provided between the stator holder 30 and the inner circumferential surface 21f of the housing 21. Therefore, even if the stator 23 vibrates in the radial direction according to rotation of the rotor 22, the vibration is unlikely to be transmitted to the housing 21 through the stator holder 30. As a result, it is possible to effectively reduce noise generated by vibration of the housing 21 when the motor unit 20 operates.

In addition, when the stator 23 is accommodated inside the stator holder 30, heat generated from the stator 23 is transmitted to the stator holder 30. Since a gap S is provided between the stator holder 30 in which the stator 23 is accommodated and the inner circumferential surface 21f of the housing 21, heat transmitted to the stator 23 is released into the gap S or is thermally conducted to the housing 21 through the fixing part 32. As a result, it is possible to efficiency release heat generated in the motor unit 20.

In addition, the stator holder 30 has a gap S in the radial direction between the stator holder 30 and the inner circumferential surface 21f of the housing 21 in a part other than the first end 30a in the central axis O direction. Therefore, vibration resulting from rotation of the rotor 22 is unlikely to be transmitted to the housing 21 through the stator holder 30.

In addition, when the stator holder 30 is fixed to the housing 21, it is possible to minimize a part of the stator holder 30 that comes in contact with the housing 21 to only the fixing part 32 of the first end 30a in the central axis O direction. Therefore, it is possible to more effectively reduce transmission of vibration resulting from rotation of the rotor 22 to the housing 21 through the stator holder 30.

In addition, the stator holder 30 includes the spacer 40 between the stator holder 30 and the housing 21 in the second end 30b in the central axis O direction.

In such a configuration, when the stator holder 30 is fixed only at the first end 30a in the central axis O direction, it is possible to prevent the side of the second end 30b of the stator holder 30 in the axis O direction from being displaced and coming in contact with the housing 21.

In addition, in the stator holder 30, the low-rigidity part 33 provided between the fixing part 32 fixed to the housing 21 and the holder body part 31 that holds the stator 23 is elastically deformed. Therefore, it is possible to attenuate vibration of the stator 23 occurring when the rotor 22 rotates. Therefore, it is possible to more effectively reduce transmission of vibration resulting from rotation the rotor 22 to the housing 21 through the stator holder 30.

In addition, the low-rigidity part 33 has the opening part 35 formed in the tubular part 30t. In this manner, when the opening part 35 is formed in the tubular part 30t, it is possible to easily reduce the rigidity of the stator holder 30.

In the low-rigidity part 33 of the first embodiment, the opening part 35 is formed in the tubular part 30t, but the present invention is not limited to this configuration. As long as the rigidity is reduced in the low-rigidity part 33, for example, in the low-rigidity part 33, the wall thickness of the tubular part 30t may be decreased and the low-rigidity part 33 may be made of a material that is more easily elastically deformed than the holder body part 31.

Second Embodiment

Next, a second embodiment of an electric compressor according to the present invention will be described. In the second embodiment, only a cross-sectional shape of the stator holder is different from that of the first embodiment. Therefore, parts the same as in the first embodiment will be denoted with the same reference numerals for description and redundant descriptions will be omitted.

Figure 5:
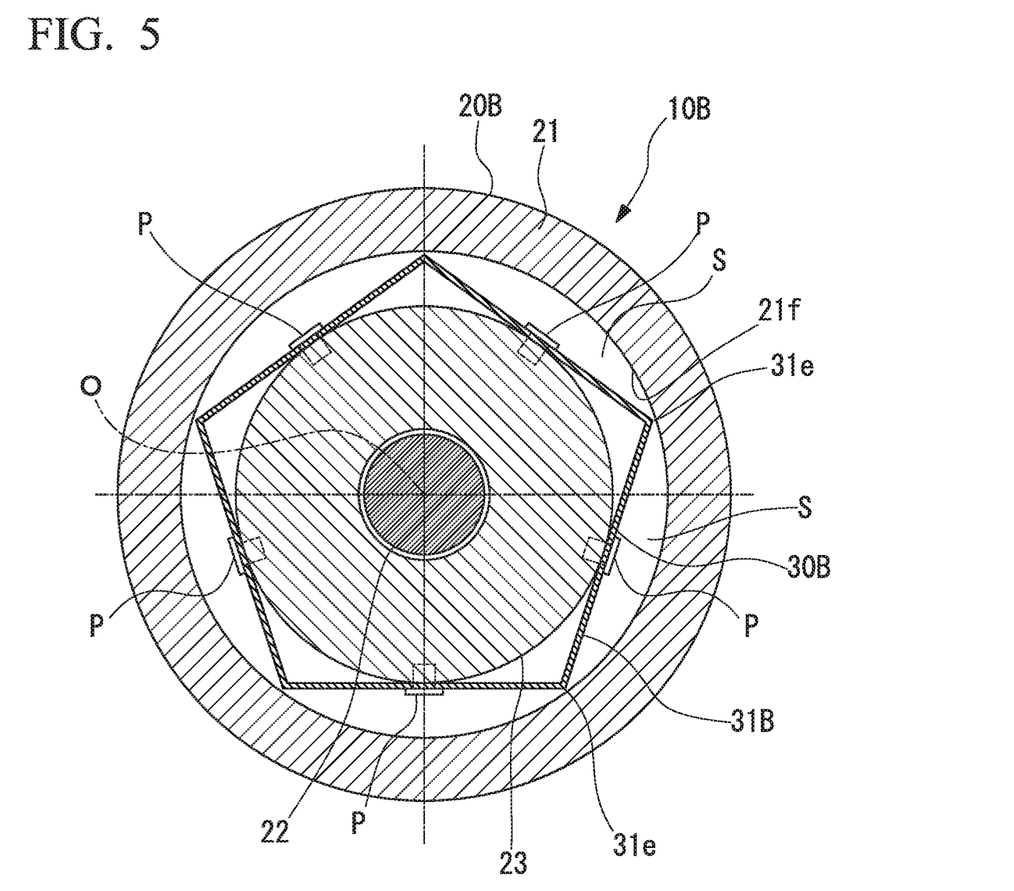
FIG. 5 is a cross-sectional view corresponding to an electric compressor in FIG. 4 in a second embodiment of the present invention.

FIG. 5 is a cross-sectional view corresponding to an electric compressor in FIG. 4 in the second embodiment of the present invention.

As shown in FIG. 5, an electric compressor 10B in this embodiment includes the compressor unit 11 (refer to FIG. 1 and FIG. 2) and a motor unit 20B.

The motor unit 20B includes the housing 21, the rotor 22, the stator 23, and a stator holder 30B.

The stator 23 is accommodated in the stator holder 30B. Like the stator holder 30 of the first embodiment, the stator holder 30B includes a holder body part 31B, the fixing part 32, and the low-rigidity part 33.

In the second embodiment, the stator holder 30B has a polygonal cross-sectional shape in a direction crossing the central axis O at least in the holder body part 31B. When the cross-sectional shape is set as a polygonal shape in this manner, it is possible to increase the rigidity.

Here, vibration occurring in the stator 23 due to rotation of the rotor 22 includes harmonics with respect to a rotational speed (fundamental frequency) of the rotor 22. In this case, when an order of harmonics in which vibration occurring in the stator 23 increases (in other words, an order of harmonics in which transmission of vibration is to be reduced) is an even number of "2" or "4," the holder body part 31B of the stator holder 30B preferably has a regular polygonal shape having an odd number of corners 31e.

In addition, when an order of harmonics in which vibration occurring in the stator 23 increases (in other words, an order of harmonics in which transmission of vibration is to be reduced) is an odd number of "3" or "5," the holder body part 31B of the stator holder 30B preferably has a regular polygonal shape having an even number of corners 31e.

Here, a determination of whether an order of harmonics in which vibration of the stator 23 increases is an odd number or an even number is generally decided according to the number of slots and the number of motor poles.

Figure 6:
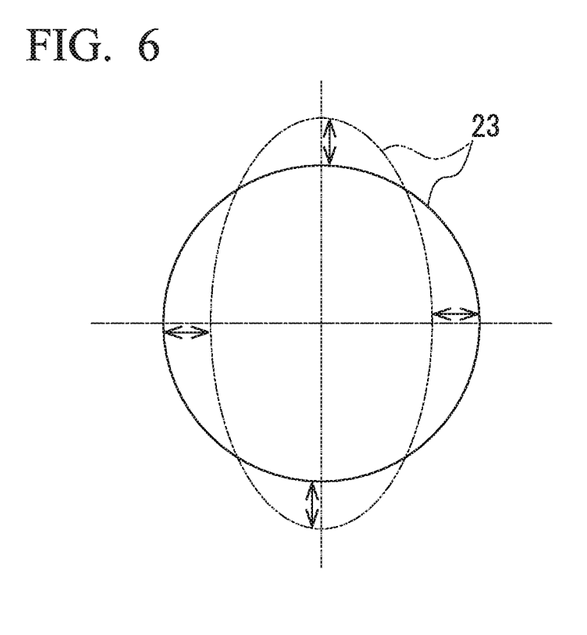
FIG. 6 is a diagram schematically showing a state of deformation of the stator when an order of harmonics is "2."
Figure 7:
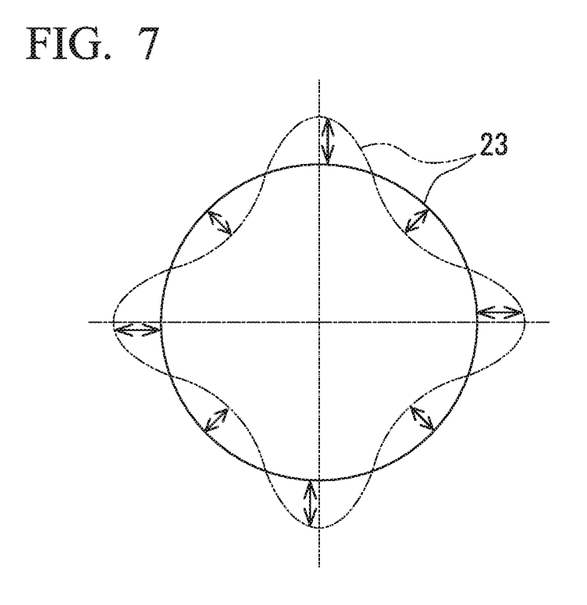
FIG. 7 is a diagram schematically showing a state of deformation of the stator when an order of harmonics is "4."

FIG. 6 is a diagram schematically showing a state of deformation of the stator when the order of harmonics is "2." FIG. 7 is a diagram schematically showing a state of deformation of the stator when the order of harmonics is "4."

For example, as shown in FIG. 6, when the order of harmonics in vibration of the stator 23 is "2," in the stator 23, two parts that are opposite to each other in the circumferential direction deform so that they protrude outward in the radial direction. On the other hand, when the holder body part 31B has, for example, a regular pentagon shape, a direction in which the stator 23 deforms and a direction in which the holder body part 31B easily deforms do not match. Therefore, it is possible to reduce the influence due to deformation of the stator 23 propagating to the holder body part 31B.

In addition, as shown in FIG. 7, when the order of harmonics in vibration in the stator 23 is "4," in the stator 23, four parts in the circumferential direction deform so that they protrude outward in the radial direction. On the other hand, when the holder body part 31B is, for example, a regular pentagon shape, similar to the case in which the order is "2," a direction in which in the stator 23 deforms and a direction in which the holder body part 31B easily deforms do not match. Therefore, it is possible to reduce an influence due to deformation of the stator 23 propagating to the holder body part 31B.

In addition, as shown in FIG. 5, the stator 23 and the holder body part 31B having a polygonal cross sectional shape are connected by a fixing member P. The fixing member P in this embodiment is fixed to the stator 23 at a central position of sides of a polygon in a cross-sectional view in the holder body part 31B. The fixing member P is made of a material such as a metal having high thermal conductivity. Here, the shape of the fixing member P is not limited to that shown in FIG. 5.

Therefore, according to the electric compressor 10B of the second embodiment described above, the stator holder 30B has a polygonal cross-sectional shape in a direction crossing the central axis O at least in the holder body part 31. In such a configuration, it is possible to increase the rigidity of the stator holder 30B and the stator holder 30B is unlikely to be influenced by vibration resulting from rotation of the rotor 22.

In addition, when higher order vibration due to rotation of the rotor 22 occurs in the stator 23, if the order of harmonics in which vibration increases is an even number, the stator holder 30B has a polygonal shape with an odd number of angles, and if the order of harmonics in which vibration increases is an odd number, the stator holder 30B has a polygonal shape with an even number of corners. Therefore, the stator holder 30B is unlikely to be influenced by vibration of the stator 23.

In addition, like the first embodiment, except for a part in which the stator holder 30B is fixed to the housing 21 in the central axis O direction, a gap S is provided in the radial direction between the stator holder 30B and the inner circumferential surface 21f of the housing 21. Therefore, vibration resulting from rotation the rotor 22 is unlikely to be transmitted to the housing 21 through the stator holder 30B. Thereby, it is possible to reduce vibration of the housing 21 and generation of noise.

In addition, since the stator 23 and the holder body part 31B are connected by the fixing member P, heat of the stator 23 can be smoothly released to the stator holder 30B through the fixing member P.

Figure 8:
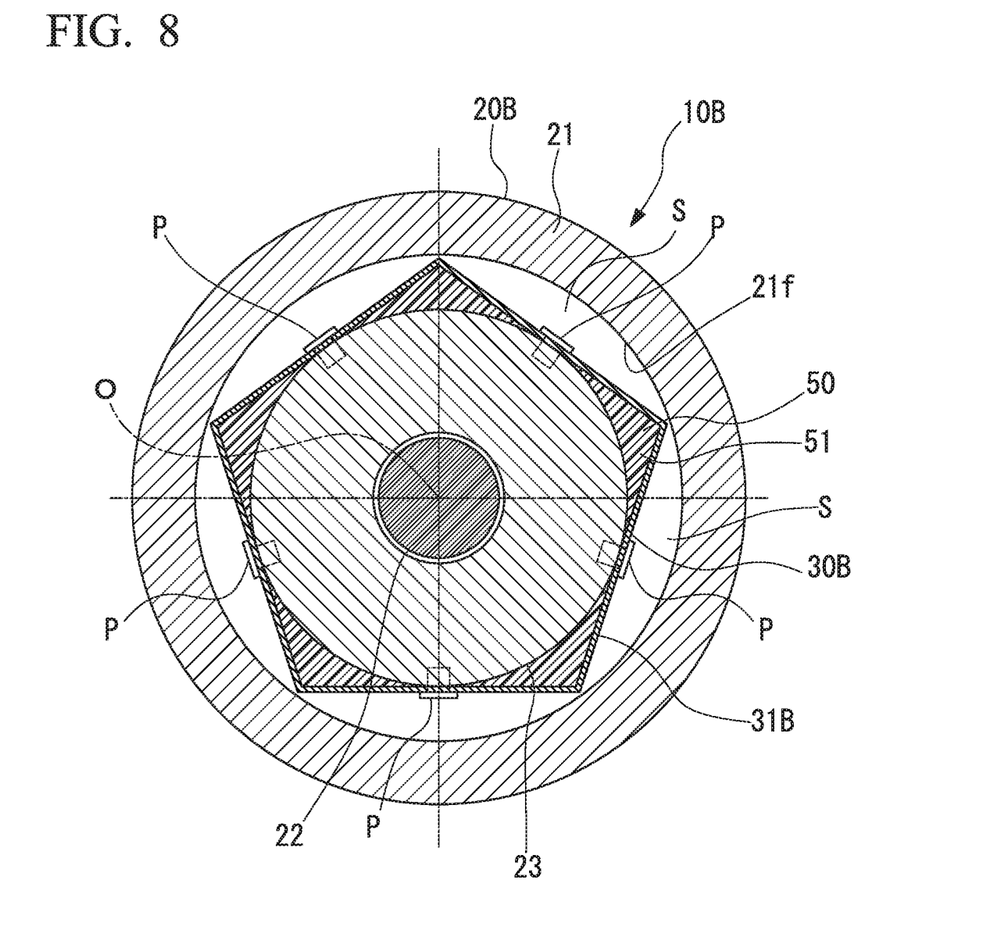
FIG. 8 is a cross-sectional view corresponding to an electric compressor in FIG. 4 in a modified example of the second embodiment of the present invention.

(Modified Examples of Second Embodiment)
FIG. 8 is a cross-sectional view corresponding to an electric compressor in FIG. 4 in a modified example of the second embodiment of the present invention.

As shown in FIG. 8, a filler 50 may be filled between the stator holder 30B and the stator 23. Here, the filler 50 increases thermal conductivity in a space 51 formed between the stator holder 30B and the stator 23. The filler 50 can be made of, for example, a resin.

In such a configuration, even if the polygonal stator holder 30B is used and thus the space 51 is formed between stator holder 30B and the rotor 22, it is possible to increase thermal conductivity between the stator holder 30B and the stator 23 by the fillet 50. Therefore, heat generated in the stator 23 when the rotor 22 operates can be transmitted to the stator holder 30B efficiently and it is possible to improve heat dissipation.

In addition, even if vibration resulting from rotation of the rotor 22 occurs in the stator 23, it is possible to absorb vibration by the filler 50 filled between the stator 23 and the stator holder 30B. Thereby, the stator holder 30B is unlikely to be influenced by vibration of the rotor 22.

(Other Modified Examples)
Here, the present invention t limited to the above embodiments, and includes various modifications of the above embodiments within the scope without departing from the spirit and scope of the present invention. That is, specific shapes, configurations and the like mentioned in the embodiments are only examples, and can be appropriately changed.

For example, in the embodiments and modified examples thereof, the stator holders 30 and 30B are fixed to the housing 21 only at the first end 30a in the central axis O direction, but the present invention is not limited thereto. For example, the stator holders 30 and 30B may be fixed to the housing 21 in an intermediate part in the central axis O direction. In addition, the stator holders 30 and 30B may be fixed to the housing 21 at both ends in the central axis O direction.

EXPLANATION OF REFERENCES

1 Turbocharger system
2 Turbocharger
3 Turbine wheel
4 Compressor wheel
6 Rotation shaft
8 Engine
9 Bypass path
10, 10B Electric compressor
11 Compressor unit
13 Impeller
20, 20B Motor unit
21 Housing
21f Inner circumferential surface
22 Rotor
22a End
22c Core part
22m Permanent magnet
22s Rotor shaft
23 Stator
24 Housing body
24a First end
24b Second end
24c, 25d Bearing support
24o Opening
24w End wall
25 Lid 26, 27 Bearing
30, 30B Stator holder
30a First end
30b Second end
30t Tubular part
31, 31B Holder body part
31e Corner
31h Screw insertion hole
32 Fixing part
33 Low-rigidity part
34 Bolt
35 Opening part
36 End wall
36h Through-hole
39 Fastener
40 Spacer
41 Ring member
50 Filler
51 Space
O Central axis
S Gap

What is claimed is:

1. An electric compressor comprising:
a compressor unit configured to compress air; and
a motor unit configured to drive the compressor unit,
wherein the motor unit includes
a housing that forms an outer frame of the motor unit,
a rotor that is provided in the housing and rotatably supported around a central axis,
a stator that is disposed radially outward from the rotor, and
a stator holder which is fixed to the housing only in a part in a central axis direction and is provided such that there is a gap in a radial direction around the central axis between it and an inner circumferential surface of the housing in a rest in the central axis direction, and inside which the stator is accommodated,
wherein the stator holder includes
a fixing part that is fixed to the housing in a part in the central axis direction,
a holder body part that holds the stator, and
a low-rigidity part which is provided between the fixing part and the holder body part in the central axis direction and has lower rigidity than the fixing part and the holder body part,
wherein the stator holder has a polygonal cross-sectional shape in a direction crossing the central axis at least the holder body part,
wherein, in the radial direction, an internal surface and an external surface of the holder body part have the polygonal cross-sectional shape, and
wherein a fixing member is fixed to the stator at a central position of sides of the polygonal cross-sectional shape.

2. The electric compressor according to claim 1, wherein the stator holder is fixed to the housing at least at a first end in the central axis direction.

3. The electric compressor according to claim 2, wherein the stator holder is fixed to the housing only at the first end in the central axis direction.

4. The electric compressor according to claim 3, wherein the stator holder has a spacer between the stator holder and the housing in the radial direction at a second end in the central axis direction.

5. The electric compressor according to claim 1, wherein the low-rigidity part includes an opening part-forming part in which a plurality of opening parts are formed at intervals in a circumferential direction around the central axis.

6. The electric compressor according to claim 1, wherein a number of corners of the polygonal shape is an odd number when an order of harmonics in which vibration of the stator increases according to rotation of the rotor is an even number, and is an even number when the order of harmonics is an odd number.

7. The electric compressor according to claim 1, wherein a filler is filled between the stator holder and the stator in the radial direction.

8. An electric compressor comprising:
a compressor unit configured to compress air; and
a motor unit configured to drive the compressor unit,
wherein the motor unit includes
a housing that forms an outer frame of the motor unit,
a rotor that is provided in the housing and rotatably supported around a central axis,
a stator that is disposed radially outward from the rotor, and
a stator holder which is fixed to the housing only in a part in a central axis direction and is provided such that there is a gap in a radial direction around the central axis between it and an inner circumferential surface of the housing in a rest in the central axis direction, and inside which the stator is accommodated,
wherein the stator holder includes
a fixing part that is fixed to the housing in a part in the central axis direction,
a holder body part that holds the stator, and
a low-rigidity part which is provided between the fixing part and the holder body part in the central axis direction and has lower rigidity than the fixing part and the holder body part,
wherein the housing includes
a housing body with an opening in the central axis direction,
a lid that closes the opening of the housing body, and
a ring member disposed between the stator and the lid, wherein the ring member prevents the stator from moving in the central axis direction.

9. An electric compressor comprising:
a compressor unit configured to compress air; and
a motor unit configured to drive the compressor unit,
wherein the motor unit includes
a housing that forms an outer frame of the motor unit, wherein the housing includes a bearing support,
a rotor that is provided in the housing and rotatably supported around a central axis,
a stator that is disposed radially outward from the rotor, and
a stator holder which is fixed to the housing only in a part in a central axis direction and is provided such that there is a gap in a radial direction around the central axis between it and an inner circumferential surface of the housing in a rest in the central axis direction, and inside which the stator is accommodated,
wherein the stator holder includes
an end wall with a through-hole, and
a spacer disposed between the through-hole and the bearing support of the housing.

* * * * *